March 17, 1953 — M. J. GEERLING — 2,631,520
CARCASS PROTECTOR
Filed Nov. 15, 1948 — 2 SHEETS—SHEET 1
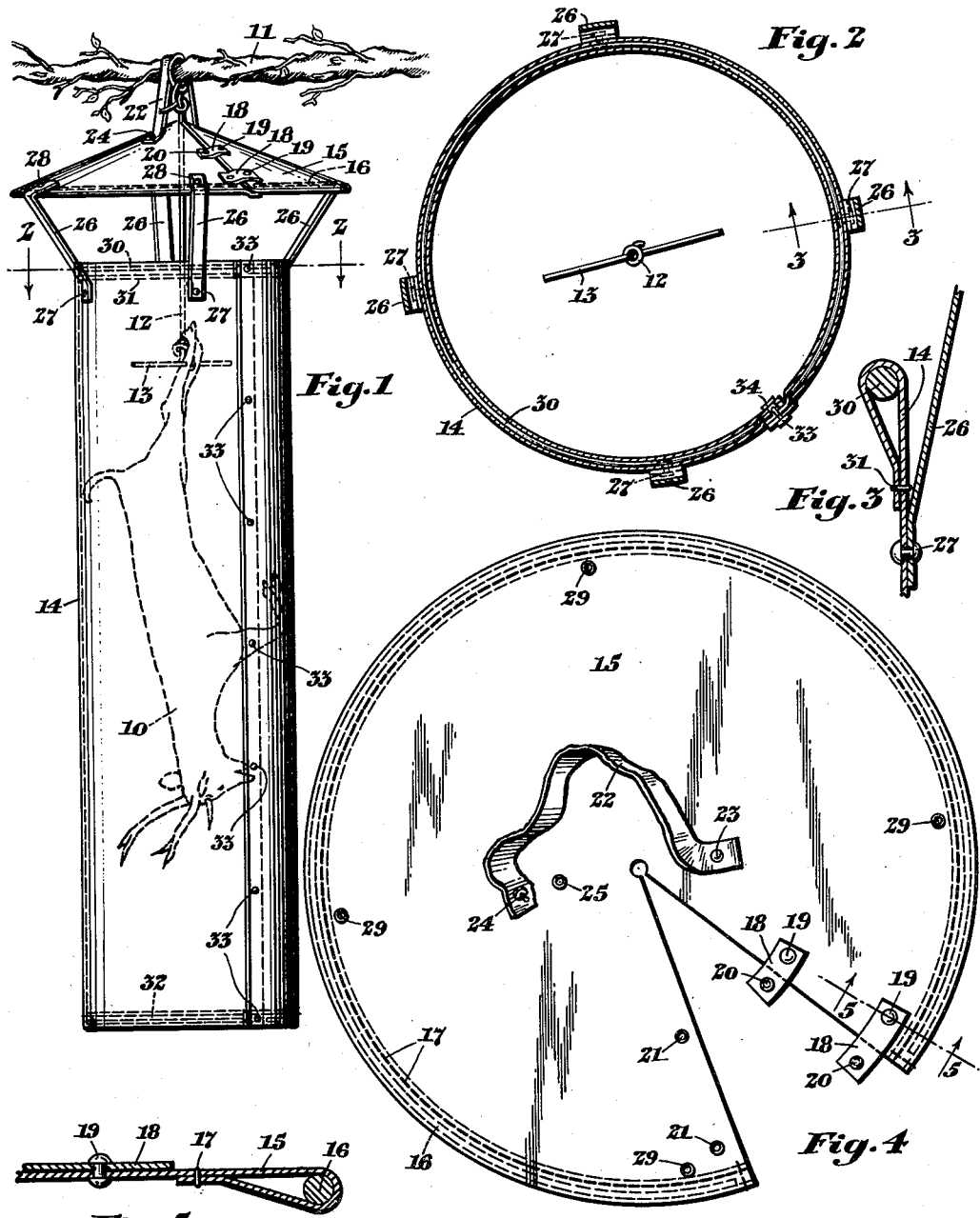
INVENTOR.
Martin J. Geerling
BY
John S. Braddock
Attorney March 17, 1953 M. J. GEERLING 2,631,520
CARCASS PROTECTOR Filed Nov. 15, 1948 2 SHEETS—SHEET 2

INVENTOR.
Martin J. Geerling
BY John S. Braddock
Attorney

Patented Mar. 17, 1953

2,631,520

UNITED STATES PATENT OFFICE 2,631,520

CARCASS PROTECTOR

Martin J. Geerling, Grand Rapids, Mich.

Application November 15, 1948, Serial No. 60,151

6 Claims. (Cl. 99—269)

1

The present invention relates to a protective covering for the hung carcass of a deer or other animal.

It frequently occurs among hunters of deer or other wild game that there is an appreciable time lapse between the time a hunter makes his kill and the time he leaves the hunting grounds for home. This situation occurs most frequently when several hunters form a party for the hunting trip, using a common conveyance for the party, and particularly when one of the hunters bags his limit of one deer—or other animal—on the opening day of the season and must thereafter wait, sometimes for several days, for the other hunters either to make their kill or to quit the hunt.

Of course the successful hunter disembowels and cleans his animal immediately after the kill, and customarily hangs it to bleed from the limb of a tree or other overhead support—preferably head downward. There is seldom any artificial refrigeration in the hunting locale, but this circumstance is of little concern when cold, dry weather prevails. However the carcass of the animal will quickly deteriorate if it become wet from rain or becomes too warm as from the rays of the sun. This invention has for its object, therefore, to provide a protective covering for the hung carcass of a deer or other animal, which will protect the carcass from rain and from the heat of the sun, and which will also protect the carcass from insects and from marauding by other animals.

Illustrative embodiments of the invention are shown in the accompanying drawings, wherein:

Figure 1 is a side elevational view of the carcass protector suspended from the limb of a tree, from which limb is also suspended the carcass of a deer shown in dotted lines within the protective covering;

Figure 2 is an enlarged, horizontal sectional view of the device taken on line 2—2 of Figure 1;

Figure 3 is a further enlarged, vertical sectional view of parts thereof taken on the line 3—3 of Figure 2;

Figure 4 is an enlarged top plan view of a sheet of material, with fittings thereon, from which the canopy portion of the device is made;

Figure 5 is a further enlarged, fragmentary, horizontal sectional view of parts shown in Figure 4, taken on the line 5—5 of Figure 4;

Figure 6:
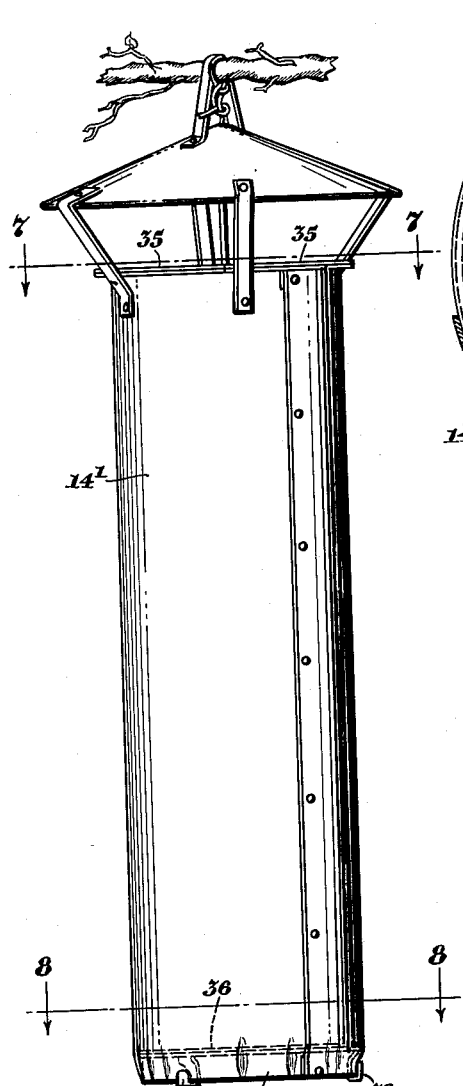
Figure 6 is a side elevational view similar to Figure 1 and showing a modified form of the invention.

2 view of the same taken on line 7—7 of Figure 6; and

Figure 8:
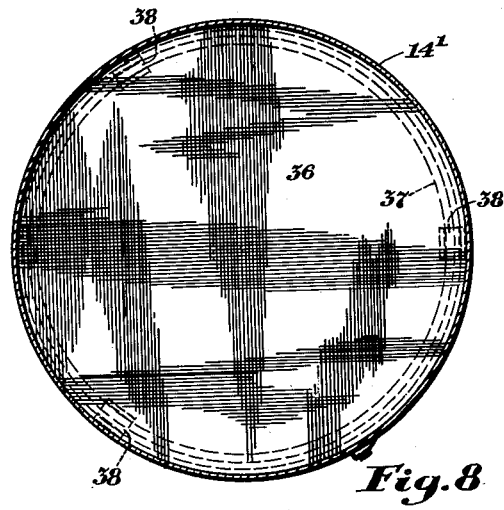

Figure 8 is an enlarged, horizontal sectional view of the same taken on line 8—8 of Figure 6.

Referring now in detail to these drawings, and referring first particularly to Figures 1-5 inclusive, the protective covering is here shown applied to the carcass of a deer designated 10, which has been hung from the limb 11 of a tree by means of a rope 12 having its lower end secured to a rod 13 passed through the hind legs of the carcass and having its upper end tied to the tree limb 11. The protective covering generally comprises a tubular sheath 14 which surrounds the carcass and which is suspended from an overhanging canopy 15 which in turn is suspended from the tree limb 11. The sheath 14 and the canopy 15 are both made of a waterproof and heat-resistant material such as canvas or duck, and may be of any other suitable material.

As best seen in Figure 4, the sheet of material which comprises the canopy 15 is in the form of a circle with a sector removed therefrom. A heavy wire or rod 16 having a normally substantially circular set, is secured as by stitching 17 within the hemmed circumferential marginal edge of this sheet of material (see Figures 4 and 5). Straps 18 are secured as by rivets 19 to one of the radial marginal edges of the material and are provided with fastener elements 20 which may be cooperatively engaged with fastener elements 21 on the other radial marginal edge of the material to thus detachably maintain the sheet of material in the form of a cone. Suspension means are provided for suspending this conical canopy in downwardly divergent position over the carcass, such means comprising as here shown a strap 22 secured at one of its ends as by a rivet 23 to one side of the center of the canopy, said strap being passed over the tree limb 11 and being detachably secured in position thereon by means of cooperating fastener elements 24 and 25 on the other end of the strap 22 and one the other side of the center of the canopy 15 respectively (see Figure 4).

The sheet of material which comprises the tubular sheath 14 surrounding the carcass is of generally rectangular formation, and is suspended from the lower periphery of the canopy as by means of straps 26 which are secured as by rivets 27 to the upper marginal edge of said sheet and which may be detachably connected to the canopy by means of cooperating fastener elements 28 and 29 on the upper ends of the straps 26 and on the peripheral edge of the canopy 15 respectively. A heavy wire or metal rod 30 having a normally substantially circular set is secured as by stitching 31 in the hemmed upper marginal edge of the sheath 14 and a similar rod 32 is similarly hemmed within the lower marginal edge thereof. These rods 30 and 32 serve to maintain the sheath in substantially cylindrical form, and the sheath is closed to form a tube by means of cooperating fastener elements 33 and 34 on the respective longitudinal marginal edges of the sheath (see Figures 1 and 2).

The device is applied as a protective covering to the previously hung carcass of a deer or other animal by first encircling the rope 12 (by means of which the animal is hung) with the canopy material 15, securing the material to the tree limb 11 by means of the strap 22, and closing the material by means of the straps 18 to form a downwardly divergent conical canopy suspended over the carcass. The sheath material 14 is then suspended from the canopy by means of the straps 26 and is then closed by means of the fastener elements 33 and 34 to form a tube surrounding the carcass. The carcass is thus protected against rain and the heat of the sun.

Figure 7:
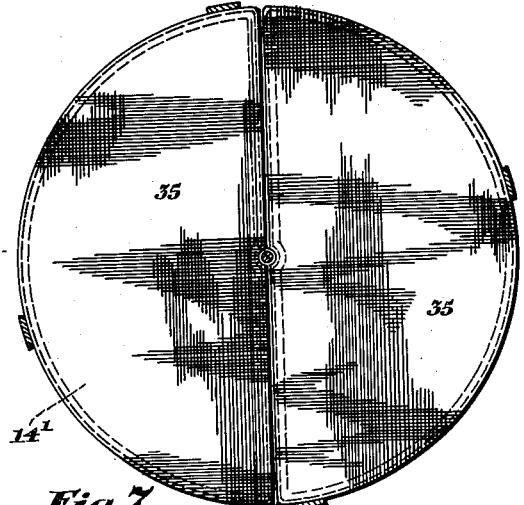
Figure 7 is an enlarged, horizontal sectional

Means are also provided for protecting the carcass against insects and marauding animals. As shown in Figures 6-8 inclusive, these means comprise a meshed closure disposed over the top of the sheath 14¹, which closure is here shown formed in complementary halves 35, and another meshed closure 36 for the bottom of the sheath 14¹ which latter closure rests against the inwardly drawn, pleated lower end 37 of the sheath 14¹. Clips 38 may be provided for securing the closure 36 to the bottom edge of the sheath 14¹ as shown, to prevent this closure's being lifted to permit entry of marauding small animals. The closures 35 and 36 are preferably fabricated of wire screen mounted on suitable frames, but may be of an open mesh fabric. In either case, sufficient passage of air is permitted to insure proper ventilation of the interior of the sheath.

It will thus be seen that the invention provides a novel and utilitarian protective covering for the carcass of a slain animal, and that the device when not in use is susceptible of convenient and compact storage.

While but two specific embodiments of the invention have been herein shown and described, it will be understood that numerous details thereof may be altered or omitted without departing from the spirit of the invention as the same is defined by the following claims.

I claim:

1. A protective covering for the hung carcass of a deer or other animal, comprising: a canopy, means for detachably suspending the canopy above the carcass from the same support on which the carcass is hung with the suspension means for the carcass depending through the center of the canopy, a tubular sheath for surrounding the carcass, and means for detachably suspending the upper marginal edge of the sheath from the peripheral edge of the canopy.

2. A protective covering for the hung carcass of a deer or other animal, comprising: a waterproof and heat-repellant canopy, means for detachably suspending the canopy above the carcass from the same support on which the carcass is hung with the suspension means for the carcass depending through the center of the canopy, a waterproof and heat-repellant tubular sheath for surrounding the carcass, and means for detachably suspending the upper marginal edge of the sheath from the peripheral edge of the canopy.

3. A protective covering for the hung carcass of a deer or other animal, comprising: a canopy, means for detachably suspending the canopy above the carcass from the same support on which the carcass is hung with the suspension means for the carcass depending through the center of the canopy, a tubular sheath for surrounding the carcass, means for detachably suspending the upper marginal edge of the sheath from the peripheral edge of the canopy and spacedly therefrom, a meshed closure for the top of the sheath, and another meshed closure for the bottom of the sheath.

4. A protective covering for the hung carcass of a deer or other animal, comprising: a waterproof and heat-repellant canopy, means for detachably suspending the canopy above the carcass from the same support on which the carcass is hung with the suspension means for the carcass depending through the center of the canopy, a waterproof and heat-repellant tubular sheath for surrounding the carcass, means for detachably suspending the upper marginal edge of the sheath from the peripheral edge of the canopy and spacedly therefrom, a meshed closure for the top of the sheath, and another meshed closure for the bottom of the sheath.

5. A protective covering for the hung carcass of a deer or other animal, comprising: a sheet of material having the form of a circle with a sector removed therefrom, a metal rod of normally substantially circular set hemmed within the circumferential marginal edge of said sheet, suspension means attached to the middle of the sheet whereby the sheet may be suspended from the same support on which the carcass is hung with the suspension means for the carcass depending through the center of said sheet, cooperating fastening means along the radial marginal edges of said sheet whereby said edges may be detachably secured together to maintain the sheet in the form of a downwardly divergent conical canopy, a second sheet of material having a substantially rectangular form and adapted to be curled around said carcass to form a substantially cylindrical sheath therearound, metal rods of normally substantially circular set hemmed within the top and bottom marginal edges respectively of said sheath for maintaining the sheath in substantially cylindrical form around the carcass, cooperating fastening means along the longitudinal marginal edges of said second sheet whereby said edges may be detachably secured together to close the sheath into tubular form, and suspension straps detachably suspending the upper marginal edges of the tubular sheath from the lower circumferential marginal edge of the canopy spacedly therefrom and from spaced points therearound.

6. A protective covering for the hung carcass of a deer or other animal, comprising: a sheet of waterproof and heat-repellant material having the form of a circle with a sector removed therefrom, a metal rod of normally substantially circular set hemmed within the circumferential marginal edge of said sheet, suspension means attached to the middle of the sheet whereby the sheet may be suspended from the same support on which the carcass is hung with the suspension means for the carcass depending through the center of said sheet, cooperating fastening means along the radial marginal edges of said sheet whereby said edges may be detachably secured together to maintain the sheet in the form of a downwardly divergent conical canopy, a second sheet of waterproof and heat-repellant material having a substantially rectangular form and adapted to be curled around said carcass to form a substantially cylindrical sheath therearound, metal rods of normally substantially circular set hemmed within the top and bottom marginal edges respectively of said sheath for maintaining the sheath in substantially cylindrical form around the carcass, cooperating fastening means along the longitudinal marginal edges of said second sheet whereby said edges may be detachably secured together to close the sheath into tubular form, and suspension straps detachably suspending the upper marginal edges of the tubular sheath from the lower circumferential marginal edge of the canopy spacedly therefrom and from spaced points therearound.

MARTIN J. GEERLING.

REFERENCES CITED

The following references are of record in the file of this patent:

UNITED STATES PATENTS

| Number | Name | Date |
|---|---|---|
| 406,178 | Palmer | July 2, 1889 |
| 851,429 | Noble | Apr. 23, 1907 |
| 882,046 | Becker | Mar. 17, 1908 |
| 1,003,736 | Haden | Sept. 19, 1911 |
| 1,749,776 | O'Lena | Mar. 11, 1930 |
| 1,762,668 | Schandra et al. | June 10, 1930 |
| 2,365,303 | Smith | Dec. 19, 1944 |
| 2,372,439 | Lofgren | Mar. 27, 1945 |
| 2,461,227 | Mewherter | Feb. 8, 1949 |